United States Patent [19]

Brunet

[11] Patent Number: 4,611,828

[45] Date of Patent: Sep. 16, 1986

[54] END MEMBERS FOR BICYCLE PUMP CONNECTORS

[75] Inventor: Patrice Brunet, Neuilly-sur-Seine, France

[73] Assignee: Poutrait-Morin, Aubervilliers, France

[21] Appl. No.: 655,464

[22] Filed: Sep. 28, 1984

[30] Foreign Application Priority Data

Sep. 30, 1983 [FR] France .............................. 83 15598

[51] Int. Cl.⁴ .............................................. F16L 35/00
[52] U.S. Cl. ......................................... 285/3; 285/23;
285/251; 285/354; 141/38; 141/384; 152/415;
411/39
[58] Field of Search ................ 285/251, 3, 4, 23, 237,
285/242, 354; 411/39, 40, 41, 301; 152/415;
141/38, 382-386, 388

[56] References Cited

U.S. PATENT DOCUMENTS

| 2,468,338 | 4/1949 | MacWilliam | 285/84 |
| 3,102,571 | 9/1963 | Scott | 411/301 |
| 3,434,746 | 3/1969 | Watts | 285/3 X |
| 4,236,953 | 12/1980 | Takahashi | 156/244.13 |

FOREIGN PATENT DOCUMENTS

| 925326 | 2/1955 | Fed. Rep. of Germany . | |
| 1264634 | 5/1961 | France . | |
| 2191700 | 2/1974 | France . | |
| 431015 | 9/1948 | Italy | 285/251 |
| 171021 | 4/1960 | Sweden | 285/251 |
| 152762 | 5/1932 | Switzerland | 285/251 |

Primary Examiner—Dave W. Arola
Attorney, Agent, or Firm—Charles E. Brown; Charles A. Brown

[57] ABSTRACT

End members for flexible connectors for bicycle pumps are provided, a first end member is fixed to one end of a flexible tube and to be connected to a valve of a tire and the second end member is to be connected to the other end of the flexible tube for connection to a pump. The first end member is made of one piece of molded construction and, at one side of a middle zone has an anchoring stub which carries a cap at its free and by means of at least two frangible bridges. At the other side of the middle zone the first end member has means for linking the connector with the valve of a tire. The middle portion also has resiliently deformable portions for holding the connector in a bore in the handle of the pump. For assembling the first end member with the tube, the cap is fitted over an end portion of the tube and, the bridges are severed and the anchoring stub is engaged inside the flexible tube.

8 Claims, 7 Drawing Figures

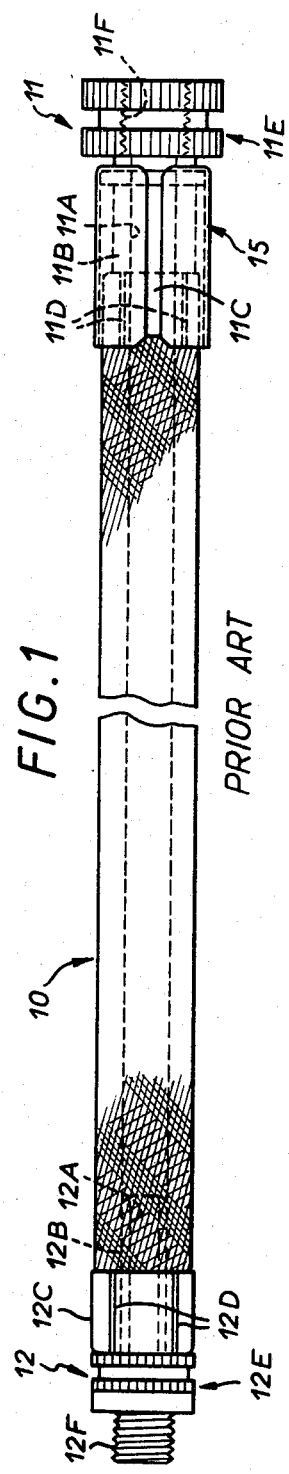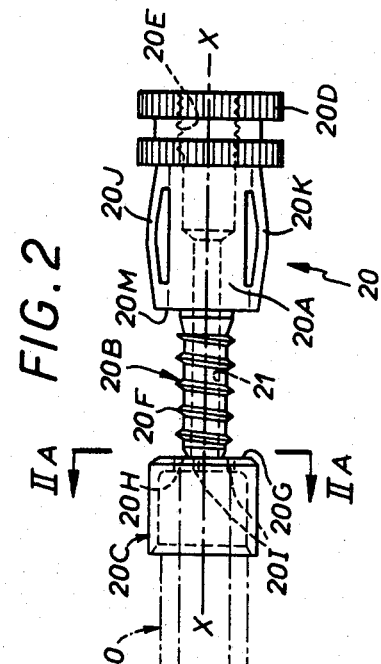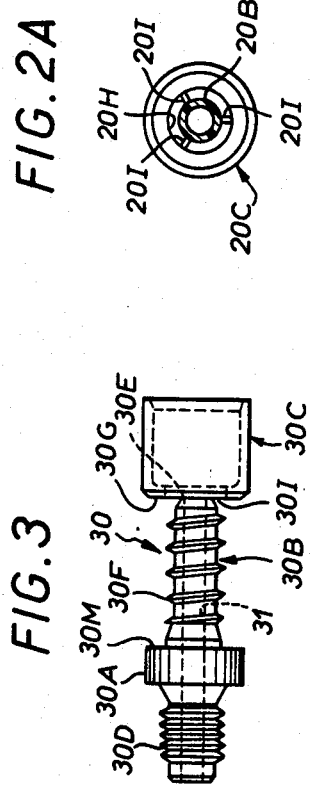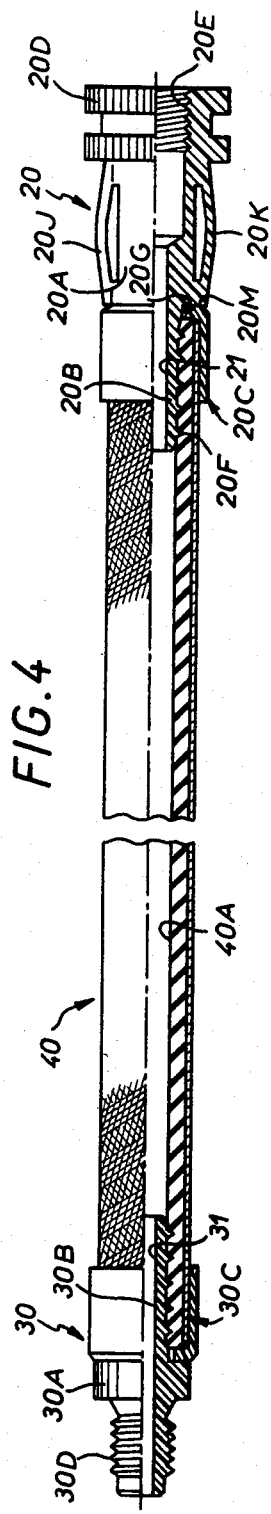
FIG. 1 PRIOR ART
FIG. 2
FIG. 2A
FIG. 3
FIG. 4

END MEMBERS FOR BICYCLE PUMP CONNECTORS

The invention relates generally to flexible connectors to connect portable pumps to tires to be inflated and more particularly to the end members of such connectors.

Flexible connectors are known comprising a flexible tube provided with an end member at each end, one of the end members being for connection to the body of a pump and the other of the end members being for connection to a valve of a tire.

The end member designed for connection to a valve has hitherto comprised three metal components: a first component, which is engaged in an end portion of the tube and can make a connection to a tire valve; a second component which is fitted over the end of the tube and is crimped to secure the first component to the tube; and a third component in the form of a resiliently deformable open ring, which retains the connection in position when it is pressed for storage, in known manner, into a bore in the handle of a pump.

The other end member, to be connected to the body of the pump, comprises two components: a first component for engagement in an end portion of the tube and having a threaded portion for connection to the body of the pump, and a second component which is fitted over the end of the tube and is crimped to secure the first component to the tube.

The production of connectors by the present day process described above is not without its disadvantages, particularly it involves several machining operations to form the conponents making up each end member and time consuming operations to assemble the end members with the tube.

According to the invention end members to be assembled with a flexible tube to form a connector for a portable pump for inflating tires comprise a first end member to make a connection with a pump and a second end member to make a connection with a valve of a tire, wherein each end member has an anchoring stub on the external surface of which a respective end of the flexible tube is engaged, the anchoring stub is formed at one side of a middle zone and is extended by an end cap with the cap joined to the anchoring stub by at least two bridges which can be broken and the end members are each made in one piece by molding from a plastics material.

Preferably the second end member has resiliently deformable means on the external surface of its middle zone. The deformable means may be two convex strips which are diametrically opposed and extend parallel with the longitudinal axis of the second end member. The strips can retain the connector in a bore in a pump.

A first advantage of the end members of the invention is in the ease of assembling them with the respective ends of the flexible tube; this can be done in one step for each end member and as a result the assembly time can be considerably reduced as compared with the prior art assembly, thus allowing high production speeds.

By forming the end members in one piece by molding, machining operations are no longer required and assembly with the tube can be reduced to a single operation; as a result considerable amounts of time can be saved as compared with prior art methods.

Another advantage of connectors having end members according to the invention is that their weight can be well below that of prior art connectors: a weight reduction of the order of 50% can be obtained, which is not negligible in the field in question.

The invention is diagrammatically illustrated by way of example with reference to the accompanying drawings, in which:

FIG. 1 is an elevation showing a flexible connector of the prior art, fitted with an end member which is designed to be connected to a tire valve of the SCLAVERAND kind;

FIG. 2 is an elevation of an end member according to the invention; designed to be connected to a SCLAVERAND valve;

FIG. 2A is a section taken on line IIA—IIA in FIG. 2;

FIG. 3 is a view similar to FIG. 2 of an end member according to the invention to be connected to the body of a pump;

FIG. 4 shows a connector with end members as in FIGS. 2 and 3, the connector being shown half in longitudinal elevation and half in longitudinal section;

Figure 5:
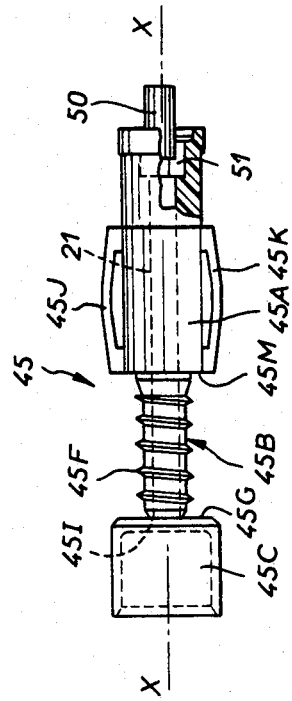
FIG. 5 shows an end member according to the invention, designed to be connected to a tire valve of the SCHRADER kind.

Referring to FIG. 1, a connector of known kind comprises a flexible tube 10 with end members 11, 12 fixed to its ends, the end member 12 to be connected to the body of a pump and the end member 11 to a valve of a tire. The end member 11 may be designed for connection either to a valve of the SCLAVERAND kind or to a valve of the SCHRADER kind. In FIG. 1 the end member 11 shown is for a valve of the SCLAVERAND kind.

The end members 11, 12, each of which has an axial passage 11A, 12A therein for the passage of air, are provided in known manner with a stub 11B, 12B to be engaged inside the flexible tube. The end members are then secured to the flexible tube by means of a cap 11C, 12C, which is placed over an end portion of the flexible tube and crimped onto the tube by permanent deformations 11D, 12D.

The end member 12 has a threaded portion 12F beyond a circular collar 12E, to link the connector with the body of the pump, while the end member 11 has a screwthread 11F inside a collar 11E, to link the connector with a tire valve.

To enable the connector to be retained in a bore in the handle of the pump when the pump is not in use, the connector is provided at the end member 11 with a resiliently deformable metal retaining ring 15, which engages lightly by spring force the wall of the bore in the handle.

It will readily be appreciated that the manufacture of a connector of this known kind involves a multiplicity of machining phases, which have to be carried out in preparing the constituents of the metal end members; similarly the assembly of the end members with the tube necessitates machining operations, since the caps have to be deformed in the crimping process. Then again an additional operation is necessary as far as the positioning of the retaining ring is concerned.

It will be understood that all these operations take time, which is an obstacle to high manufacturing speeds being obtained.

Referring to FIG. 2, an end member 20, is to be connected to a valve of the SCLAVERAND kind. The end member 20 is made in one piece by molding from a plastics material and comprises a middle zone 20A, which is extended on one side by an anchoring stub 20B carrying an end cap 20C; at the other side of the said middle zone the end member has a serrated collar 20D with internal screw thread 20E.

The anchoring stub 20B is cylindrical of revolution and has protuberances on its surface, to anchor the end member inside the tube; in the example illustrated the protuberances are in the form of a helical rib 20F, although it will be appreciated that other suitable kinds of protuberance could be provided. The cap 20C has a base 20G with a bore 20H formed in it, and the cap is carried at the end of the anchoring stub 20B by at least two, but preferably three bridges 20I which can be broken; this is shown particularly in FIG. 2A, from which it will be seen that the bridges are connected to the bore 20H and to the front surface of the anchoring stub 20B.

For the purpose of retaining the connector inside a bore in the handle of a pump, the middle zone 20A of the end member is provided with resiliently deformable means; in the example illustrated these means comprise one and preferably two strips 20J, 20K, which are parallel with the axis X—X of the end member and diametrically opposed and which have a convex longitudinal profile. The strips 20J, 20K are integral with the middle zone at their ends and spaced therefrom between their ends.

It will be appreciated that the distance between the outside edges of the strips is slightly greater than the diameter of the bore formed in the handle of the pump (not shown here), so that the slight compression exerted on the strips by the wall of the bore immobilises the connector inside the handle.

The other end member, shown generally at 30, is for connection to the body of the pump. As can be seen clearly from FIG. 3, an end member of this kind comprises a middle zone 30A forming a collar with a serrated surface. The collar is extended at one side by an anchoring stub 30B carrying an end cap 30C and a screw thread 30D is provided at the other side. The cap 30C is joined to the anchoring stub 30B in a way similar to that described in connection with FIG. 2, that is to say, by means of three bridges 30I which can be broken and which connect a base 30G of the cap to the anchoring stub, the stub being provided with a helical rib 30F on its surface.

Each of the end members 20, 30 is provided with an axial bore 21 and 31 respectively, forming a passage for passage of air.

The end members thus constructed, each made of only one piece, are designed to be rigidly assembled with the ends of a flexible tube 40.

The end members can be assembled particularly easily with the flexible tube by fitting the caps 20C, 30C over the end portions of the tube 40. After the ends 20G, 30G of the caps 20C, 30C are in abutment with the ends of the tube, the bridges 20I, 30I can be made to give way, for example by driving one of the components in rotation; this enables the anchoring stubs 20B, 30B to pass inside the tube until the corresponding faces 20M, 30M of the middle zones 20A, 30A come into abutment with the bottom of the respective caps 20C, 30C.

Since the diameter of the anchoring stubs and the base of the ribs is at least equal to the diameter of the passage 40A formed in the tube 40, the stubs exert a pushing back action on the wall of the passage 40A by means of the ribs 20F, 30F while they are being inserted in the tube; since the wall cannot extend externally with the caps 20C, 30C present, the rib on each anchoring stub goes into the material of the tube and thus anchors the end members to it; air tightness is provided by surface contact between the rib on the anchoring stub and the wall of the passage 40A.

The two end members may be assembled with the tube either simultaneously or separately; in either case it should be emphasized that the end members are made of one piece and are thus easy to manufacture, and that they can be assembled with a tube 40 in one operation.

Figure 6:
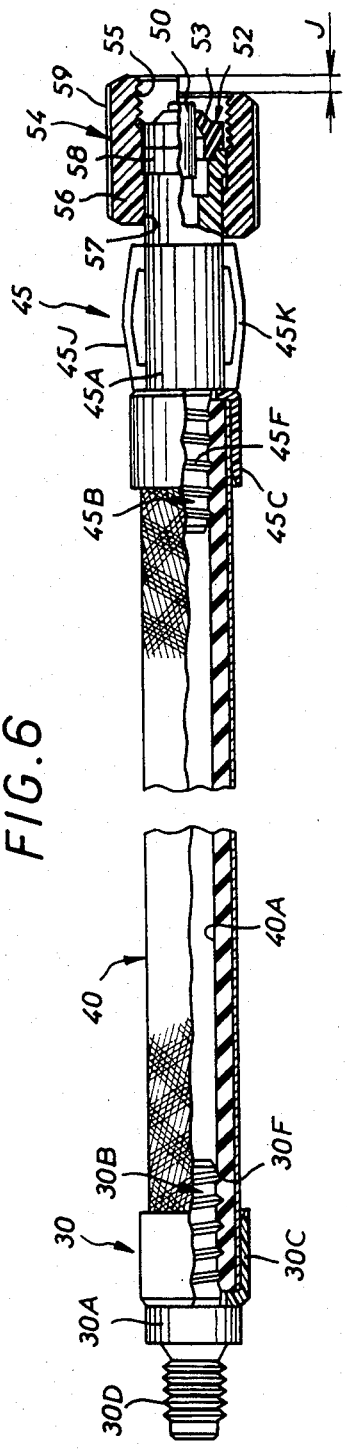
FIG. 6 is a view similar to FIG. 4 of a connector fitted with an end member for a SCHRADER valve as shown in FIG. 5.

With regard to a connection for use on a SCHRADER kind of valve as shown in FIGS. 5 and 6, the end member to be connected to the body of the pump is identical with the end member 30 previously described; it therefore carries the same references. The method of assembly is also identical.

As with the other end member, referred to generally as 45, it has a middle zone 45A with strips 45J, 45K. At one side of the middle zone the end member is provided, beyond an abutment surface 45M, with an anchoring stub 45B with a rib 45F. The anchoring stub is extended by a cap 45C, the base 45G of which is connected to the stub by at least two bridges 45I which can be broken. The middle zone, the anchoring stub and the link between the cap and the stub are as described previously in connection with FIG. 2. At the other side of the middle zone 45A, the end member 45 is provided with an axial push rod 50 and a recess to receive a valve 52 with a peripheral lip 53 co-operating with the push rod. To connect an end member of this kind to a valve, the end member is provided with a connecting sleeve 54 which is screwthreaded at 55 and which has a heel 56 opposite the threading, the heel being formed by a bore 57 slightly smaller in diameter than a collar 58 formed on the end member. The connecting sleeve is provided with serrations 59 on its external surface and is assembled with the end member in such a way that, when the heel 56 has been passed by force over the collar 58, it allows the connecting sleeve to be mounted freely on the end member, both in rotation and axially, with a clearance such as that indicated at J in FIG. 6.

What is claimed is:

1. Apparatus adapted to be assembled with a flexible tube to form a connector for a portable pump for inflating tires, said apparatus comprising a set of end members including a first end member having means for forming a connection with a pump and a second end member having means for forming a connection with a valve of a tire, each of said end members having an anchoring stub, said anchoring stub having an external surface adapted to receive a respective end of the flexible tube, said anchoring stub being formed at one side of a middle zone of a respective one of said end members and being extended by an end cap, each end cap being joined to a respective anchoring stub by at least two frangible bridges, each of said end members being of one-piece molded plastics construction, said frangible bridges being adapted to be broken to separate each cap from the respective anchoring stub when a tube end is inserted into such end cap whereby a respective tube end will be gripped between such end cap and the respective anchoring stub.

2. Apparatus according to claim 1, in which each of said anchoring stubs has at least one riblike anchoring protuberance on its external surface.

3. Apparatus according to claim 2, in which said at least one riblike protuberance is helical.

4. Apparatus according to claim 1, in which said second end member has resiliently deformable means on an external surface of its middle zone for resiliently securing said second end member to a portable pump.

5. Apparatus according to claim 4, in which the resiliently deformable means comprise two diametrically opposed convex strips extending parallel to the longitudinal axis of said second end member.

6. Apparatus according to claim 1, in which the said second end member has an internal screw thread and an external surface including serrations beyond the second end member middle zone at the end opposite to said anchoring stub and said end cap.

7. Apparatus according to claim 1, in which said second end member includes a valve connector including an extension carrying a lip and a screwthreaded connecting sleeve located beyond said end member middle zone opposite the respective anchoring stub and end cap, said sleeve being freely rotatable on said second end member and axially restrained on said extension by a collar for movement between two end positions.

8. The apparatus of claim 1 assembled with opposite end portions of a flexible tube, said first end member being at one end of said flexible tube and said second end member being at the opposite end of said flexible tube, anchoring stub of each of said end members being telescoped in a respective tube end portion, and said end cap of each of said end members being separated from its respective anchoring stub with said bridges being broken and being telescoped over and clamping a respective tube end portion to said anchoring stub telescoped therein.

* * * * *